July 22, 1952        P. K. T. HARTMANN        2,604,007

OPTICAL SYSTEM FOR TAPE PROJECTORS

Filed Jan. 29, 1951                                3 Sheets—Sheet 1

INVENTOR
PAUL K. T. HARTMANN
BY *Gustav Drews*
his ATTORNEY

July 22, 1952   P. K. T. HARTMANN   2,604,007
OPTICAL SYSTEM FOR TAPE PROJECTORS Filed Jan. 29, 1951   3 Sheets-Sheet 2

INVENTOR
PAUL K. T. HARTMANN
BY *Gusta Drews*
his ATTORNEY

July 22, 1952 P. K. T. HARTMANN 2,604,007
OPTICAL SYSTEM FOR TAPE PROJECTORS
Filed Jan. 29, 1951 3 Sheets-Sheet 3
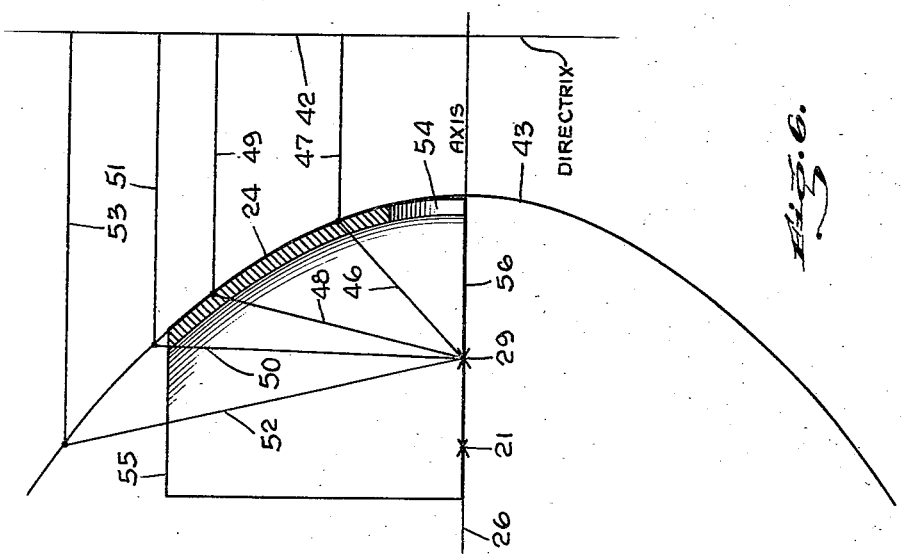
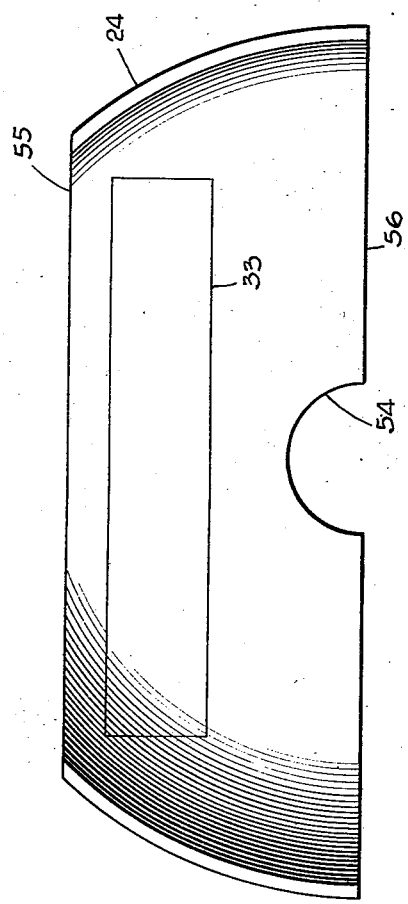
INVENTOR
PAUL K. T. HARTMANN
BY
his ATTORNEY

Patented July 22, 1952

2,604,007

UNITED STATES PATENT OFFICE 2,604,007

OPTICAL SYSTEM FOR TAPE PROJECTORS

Paul K. T. Hartmann, Woodhaven, N. Y.

Application January 29, 1951, Serial No. 208,259

5 Claims. (Cl. 88—24)

This invention relates to projection machines in general and more especially to the optical systems of projection machines for use with tape printers such as stock tickers, teletype machines, and the like.

Among the objects of the present invention it is aimed to provide an improved optical system for a projection machine for use with tape printers such as stock tickers, teletype machines, and the like, in which the tape with the impressions thereon is drawn across a light aperture, characterized in the present instance by a source of light disposed below and to one side of the light aperture, a parabolic mirror positioned to receive light rays from the source of light, an inclined plane mirror disposed between the light aperture and the source of light and in position to receive the light rays of said source of light as they are developed by said parabolic mirror and then deflect them through the tape at the light aperture.

It is still a further object of the present invention to utilize a parabolic mirror with a light source to eliminate the use of expensive condensers and the like characterized by positioning the lamp, preferably a mercury vapor lamp, with its focal point on the center line of a parabolic mirror, but disposed outwardly of the focal point of the parabolic mirror so that an inclined plane mirror can obstruct direct light rays from the lamp from passing through the light aperture but intercept only the light rays received by the parabolic mirror from the lamp and re-direct them through the light aperture.

These and other features, capabilities and advantages of the invention will appear from the subjoined detailed description of one specific embodiment thereof illustrated in the accompanying drawings in which Fig. 1 is a side elevation of an assembly including a front projection screen and projector showing the optical system with a part thereof in dotted lines.

Fig. 5 illustrates diagrammatically the relation of the light aperture to the parabolic deflector.

Fig. 6 is a section of the parabolic deflector diagrammatically illustrating its geometric formation in relation to its focal point and the light center.

Figure 1:
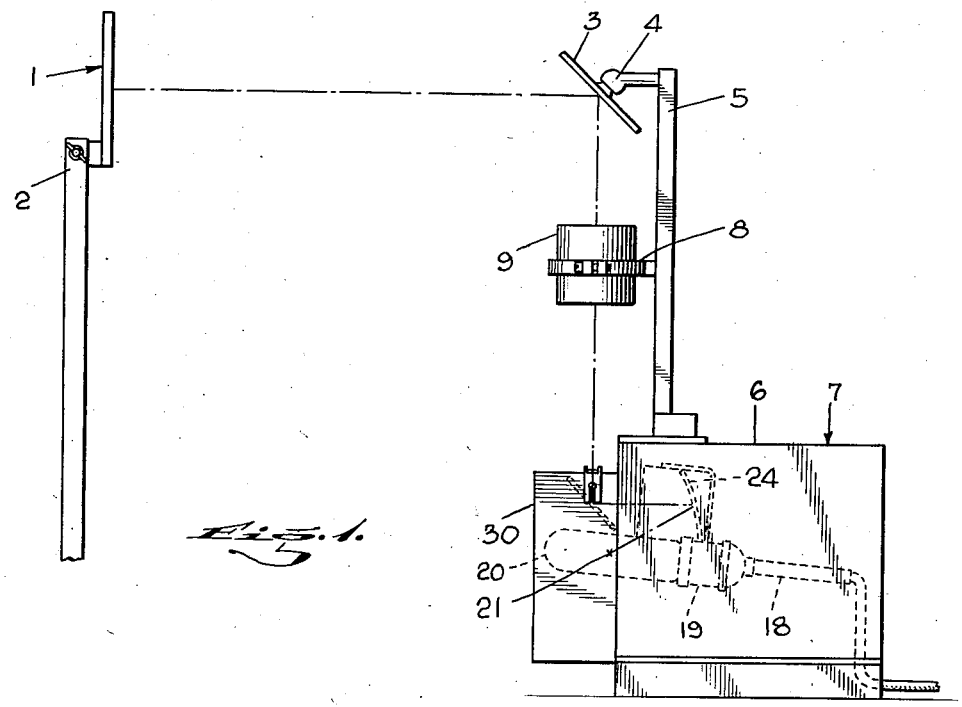

With projection machines, particularly those used for projecting images on tape being printed by stock tickers, teletype machines, and the like, such as are extensively used in stock brokers' offices, it has been the practice to use a system of condensers for directing the light rays from the source of light through the tape at the light aperture. The condensers for such systems were not only expensive for the initial installation, but also when replacements were required. Still furthermore, on account of the glass surfaces involved, they required considerable attention to maintain the same free of dust in order to obtain maximum efficiency.

With the foregoing objections in mind it was conceived that a parabolic mirror could be used to advantage. The many difficulties encountered properly controlling the light were solved by the present arrangement.

With the present arrangement a front projection screen 1 mounted on the standard 2 can be used to receive the projected image from the inclined mirror 3 mounted on the bracket 4 positioned at the upper end of the standard 5. This standard 5 in the present instance is supported to extend from the upper wall 6 of the lamp housing 7 and has a bracket 8 for mounting the objective lens unit 9. The lamp housing 7, see Fig. 4, has a stud 10 to which is pivotally connected the rod 11. The rod 11 in turn is anchored in position on the stud 10 by the nut 12 and bolt 13. On the rod 11 in the present instance are slidably mounted the clamps 14 and 15, the clamp 14 being secured in position by the lock screw 16, and the clamp 15 being secured in position by the lock screw 17. The clamp 14 is slidably connected to the tubular extension 18 of the socket 19 for the mercury vapor lamp 20, which in the present instance has its light center at 21. The clamp 15 in turn is similarly slidably connected to the rod 22, to which is secured the mirror support 23, to which mirror support 23 in turn is fixed the parabolic mirror section 24 to position the same relative to the lamp 20. The tubular extension 18 and rod 22 are in turn anchored in position in the clamps 14 and 15, respectively, by lock screws, such as the lock screw 41. The section 24, see Figs. 4 and 5, is cut away at 25 to clear the upper half of the socket 19 so that the focal center 21 of the lamp 20 will lie in the center line 26 of the parabola of which the section 24 is a portion.

Figure 4:
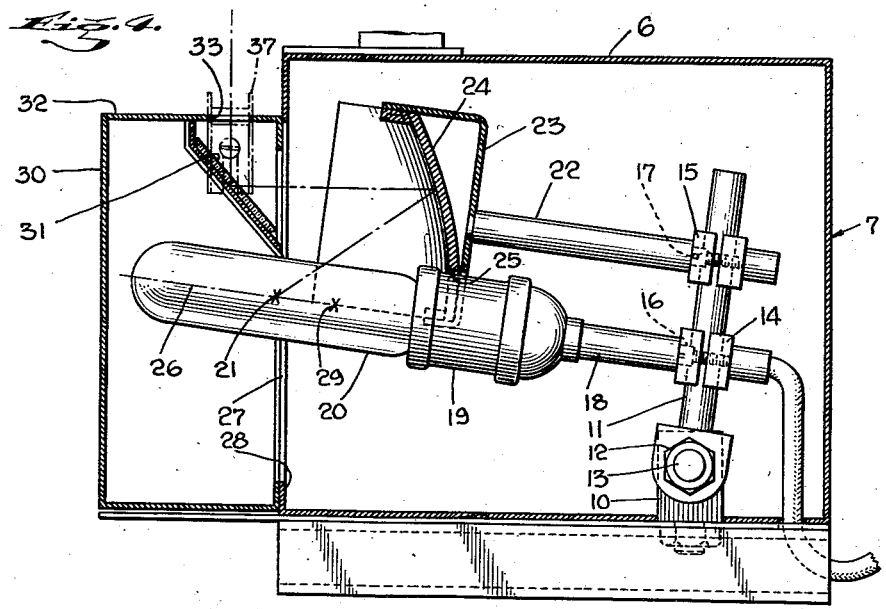
Fig. 4 is a transverse section of the lamp housing and light aperture shown in Fig. 3.

The lamp 20, as shown in Fig. 4, extends through the opening 27 in the partition 28 formed at the rear of the lamp housing 7 with the light center 21 of the lamp 20 positioned to the rear of the partition 28 and outwardly relative to the focal point 29 of the parabola of which the mirror 24 is a section.

Figure 2:
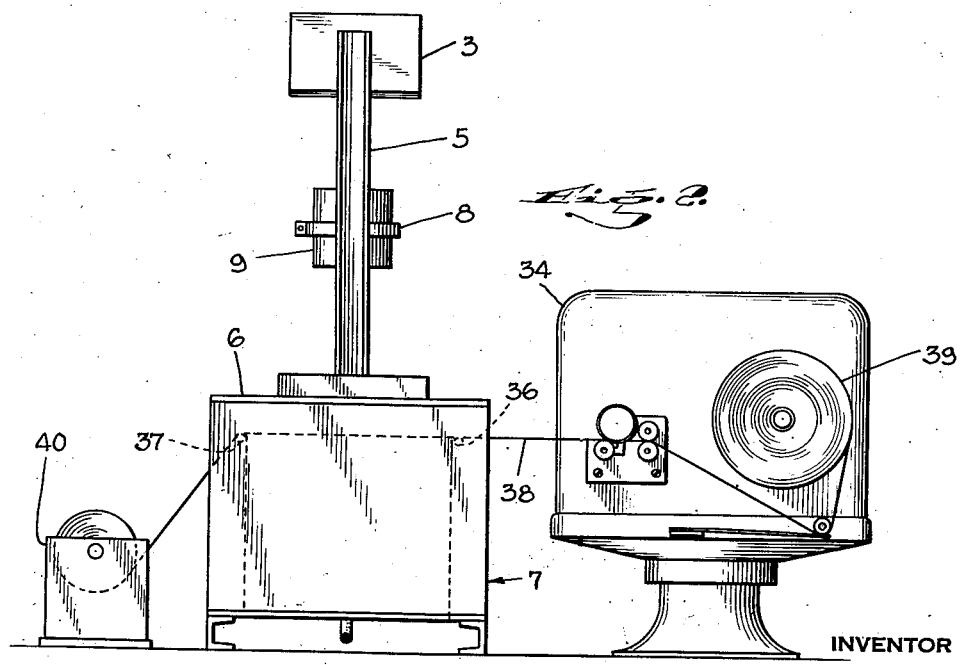
Fig. 2 is a front elevation of the projector showing the ticker and tape puller in operative relation thereto.
Figure 3:
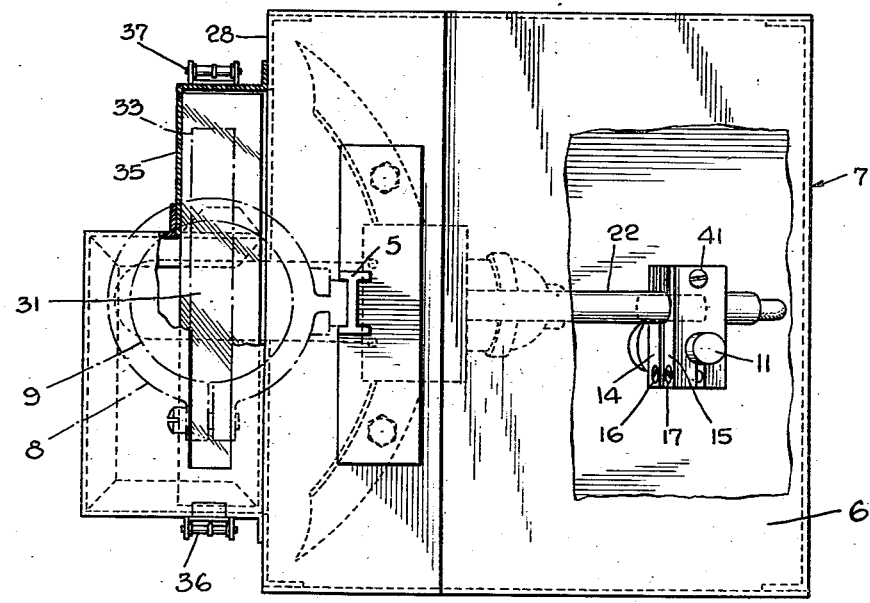
Fig. 3 is an enlarged plan view partly broken away of the projector and more particularly the lamp house and light aperture.

Above the lamp 20 and secured to the extension 30, there is positioned the inclined plane mirror 31, the extension 30 being secured to the rear end of the housing 7 fully to enclose the opening 27 in the partition 28. The upper wall 32 of the extension 30 has an opening 33 therein constituting the light aperture. This upper wall 32, with the exception of the opening 33, extends beyond the extension 30 toward the ticker 34 and is supported by the frame portion 35, see Fig. 3. The frame portion 35 is secured to the partition 28 which extends down from the frame 35 to the bottom of the lamp housing 7. Beyond the ends of the opening 33, see particularly Fig. 3, there are mounted the tape guides 36 and 37, respectively. The objective lens unit 9, see Figs. 1, 2 and 3, is disposed directly above the opening 33 constituting the light aperture so that the images of the tape 38 passing over the light aperture 33 may be projected up to the objective lens unit 9, and by it directed to the mirror 3 and eventually projected on the screen 1.

The tape 38 in the conventional way extends from the supply roll 39 secured to the ticker 34, and after being printed by the ticker 34 passes to the guide roller 36 and then to the guide roller 37, and from it passes to the tape puller 40. Any number of devices employed for taking out the vibrations in the tape 38 while passing across a light aperture 33 and for controlling the tape puller 40, which devices are generally disposed between the ticker 34 and the lamp housing 7, may be used, but since they form no part of the present invention they are here being deliberately omitted.

Upon reference to Fig. 6 it will be seen that the directrix 42 of the parabola 43 passes through the center line 26 of the parabola 43 which has the focal point 29 and that the distances 46 and 47 are equal to one another, the distances 48 and 49 are equal to one another, the distances 50 and 51 are equal to one another, and finally that the distances 52 and 53 are equal to one another in accordance with the method of constructing a parabola to determine in the present instance the parabolic curve 43. When the lamp 20 is positioned, see Fig. 5, on the center line 26 of the parabola, the deflector 24 will have a recess 54 cut out therein to clear the socket 19 of the lamp 20. The parabolic mirror 24 will then be seen to have its lower line coinciding with the center line 26 except for the recess 54 and its upper edge 55 formed in a straight line parallel to the center line 26. The rear of the mirror 24 between its upper edge 55 and its lower edge 56 will slightly exceed the area utilized to pick up the light rays from the lamp 20 and convergingly direct them onto the mirror 31 so that the mirror 31 may deflect them upwardly through the light aperture 33. In accordance with the law of deflected light rays, the light rays from the lamp 20 will be converged by the mirror 24 due to the fact that the light center 21 of the lamp 20 is disposed outwardly of the focal point 29 of the mirror 24. The nearer the light center 21 of the lamp 20 is positioned to the focal point 29 of the mirror 24, the less converging the light rays will become. Excellent results have been achieved, however, when the light center 21 of the lamp 20 is positioned just rearwardly of the partition 28 and the focal point 29 of the mirror 24 is positioned just forwardly of the partition 28.

In Fig. 5 the light aperture 33 is shown as smaller than the mirror 24. Obviously the light aperture 33 should be smaller since the light rays from the lamp as controlled by the mirror 24 will be converging and continue to converge after leaving the mirror 31.

According to the present arrangement when the lamp 20 is so positioned that its light center 21 is disposed on the center line 26 of the mirror 24, the maximum efficiency of uniform light distribution is possible, and at the same time the light rays will be converged to cooperate with the objective lens unit 9 to produce an image of the characters formed on the tape.

Excellent results have also been achieved when the tape 38 was composed of a transparent or translucent sheet of cellophane, glassine or the like.

It is obvious that various changes and modifications may be made to the details of construction without departing from the general spirit of the invention as set forth in the appended claims.

I claim:

1. The optical system for projecting the images of impressions produced by a typewriter on a light transmitting tape as the impressions are printed, characterized by a lamp having a light center, a parabolic reflector having a center line, a wide section of the reflector above the center line and its focal point on the center line, the lamp being positioned in front of said parabolic reflector with its light center disposed outwardly of the focal point of the parabolic reflector to enable converging the light rays passed to said parabolic reflector from said lamp, a relatively horizontally positioned light aperture across which the printed tape is passed, a second reflector in front of said parabolic reflector, below and inclined to said light aperture for intercepting the light rays received and deflected by said parabolic reflector, said second reflector positioned between the light center of the lamp and the light aperture to obstruct the direct light rays of the lamp from passing to the light aperture, and directing the intercepted light rays through the tape at the light aperture, an objective lens positioned to receive the light rays passing through the tape, a projection screen, and deflecting means intermediate said objective lens and said projection screen to pick up the light rays from said objective lens and direct them onto said projection screen.

2. The optical system set forth in claim 1 characterized by the focal point of the parabolic reflector being positioned between the inclined reflector and the parabolic reflector and in which system the lamp is a mercury vapor lamp.

3. The optical system set forth in claim 1 characterized by the parabolic reflector being a section of a parabola with a recess around its center, and by the lamp being a mercury vapor lamp having its socket positioned in said recess.

4. The optical system set forth in claim 1 characterized by the parabolic reflector being a section of a parabola with a recess around its center, by the lamp being a mercury vapor lamp having its socket positioned in said recess, by the light aperture being elongated, that is, longer than wide, by the upper edge of the parabolic reflector being cut off, and by the parabolic reflector being positioned to direct a bundle of converging light rays in cross section fully covering the light aperture.

5. The optical system for projecting the images of impressions produced by a typewriter on a light transmitting tape as the impressions are printed, characterized by a lamp having a light center, a concave reflector having a center line, a wide section of the reflector above the center line and its focal point on the center line, the lamp being positioned in front of said concave reflector with its light center disposed outwardly of the focal point of the concave reflector to enable converging the light rays passed to said concave reflector from said lamp, a relatively horizontally positioned light aperture across which the printed tape is passed, a second reflector in front of said concave reflector, below and inclined to said light aperture for intercepting the light rays received and deflected by said concave reflector, said second reflector positioned between the light center of the lamp and the light aperture to obstruct the direct light rays of the lamp from passing to the light aperture, and directing the intercepted light rays through the tape at the light aperture, an objective lens positioned to receive the light rays passing through the tape, a projection screen, and deflecting means intermediate said objective lens and said projection screen to pick up the light rays from said objective lens and direct them onto said projection screen.

PAUL K. T. HARTMANN.

REFERENCES CITED

The following references are of record in the file of this patent:

UNITED STATES PATENTS

| Number | Name | Date |
| --- | --- | --- |
| 1,163,192 | Adams | Dec. 7, 1915 |
| 1,523,767 | Green | Jan. 20, 1925 |
| 1,763,630 | Hopkins | June 10, 1930 |
| 1,811,770 | Wheeler | June 23, 1931 |
| 1,908,832 | Eitzen | May 16, 1933 |
| 1,932,399 | Decker | Oct. 31, 1933 |
| 2,187,071 | Bergmans | Jan. 16, 1940 |
| 2,496,675 | Pasquet | Feb. 7, 1950 |